United States Patent [19]
Hotchkiss

[11] 3,786,904
[45] Jan. 22, 1974

[54] SEGMENTED FRICTION MEMBER ASSEMBLY

[75] Inventor: Marvin E. Hotchkiss, Troy, Ohio

[73] Assignee: The B. F. Goodrich Company, New York, N.Y.

[22] Filed: June 23, 1972

[21] Appl. No.: 265,528

[52] U.S. Cl. .................... 192/107 R, 188/218 XL
[51] Int. Cl. ............................................ F16d 13/64
[58] Field of Search .. 192/107 R; 188/218 XL, 73.2

[56] References Cited
UNITED STATES PATENTS

| 3,376,960 | 4/1968 | Bender | 192/107 R |
| 3,599,766 | 8/1971 | Ely | 192/107 R |
| 3,613,851 | 10/1971 | Ely | 192/107 R |
| 3,435,925 | 4/1969 | Harrison | 192/107 R |

FOREIGN PATENTS OR APPLICATIONS

| 227,857 | 9/1968 | U.S.S.R. | 188/218 XL |

Primary Examiner—Benjamin W. Wyche
Attorney, Agent, or Firm—John D. Haney

[57] ABSTRACT

A segmented friction member assembly for a disc type brake or clutch having a continuous band extending around the peripheral surfaces of the heat-absorbing segments and between the radially outer edges of the segmental facing members. The band provides radial restraint and resists rotation of the heat-absorbing segments due to torque forces applied during operation of the assembly.

2 Claims, 3 Drawing Figures

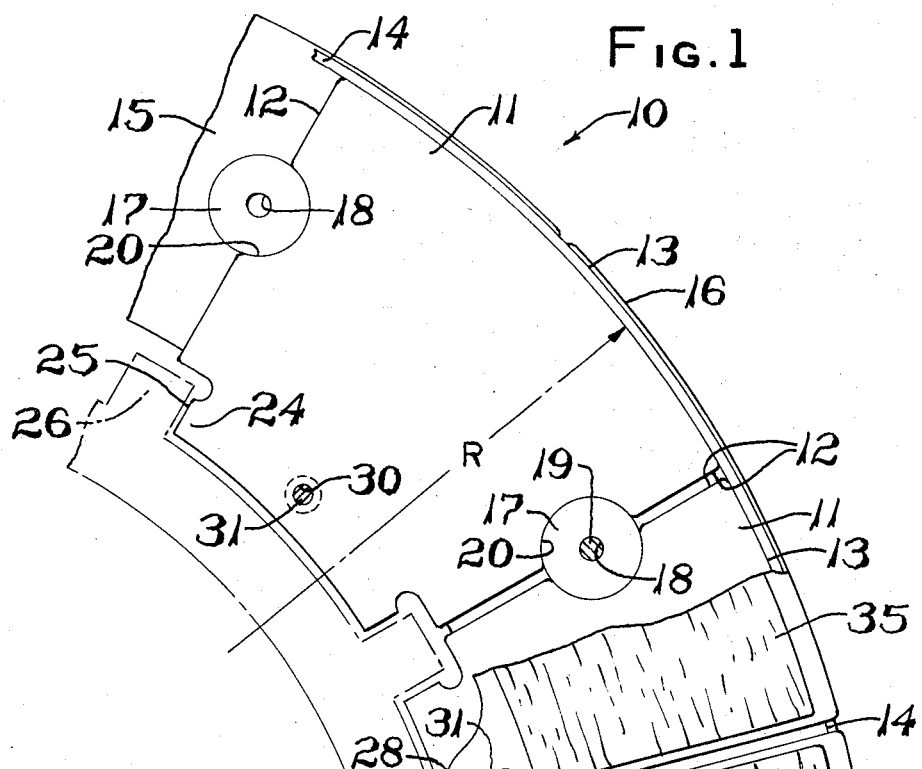
PATENTED JAN 22 1974　　3,786,904

3,786,904

SEGMENTED FRICTION MEMBER ASSEMBLY

BACKGROUND OF THE INVENTION

This invention relates to disc type brakes or clutches and particularly to the annular segmented disc assemblies which engage other disc assemblies during operation of the brake or clutch. These disc assemblies have friction surfaces which engage friction surfaces on other disc assemblies and these surfaces may carry friction lining material.

The disc assemblies have segmented plates of heat-absorbing material such as beryllium positioned between segmented facing members which support the plates and provide strength where needed in the annular disc assemblies. The segmentation reduces thermal warpage and cracking due to high heat generation which is especially important in high energy aircraft type brakes where great quantities of heat must be absorbed.

In the segmented disc assemblies used heretofore, the torque forces applied to the segments of heat-absorbing material have caused the segments to rotate and move radially outward unless the facing members and fasteners have been increased in size and strength to withstand these forces. In aircraft brakes where weight and space limitations are critical, there has been a definite need for a solution to this problem and especially for the stator disc assemblies where it is important that the heat-absorbing segments do not move radially outward where they would interfere with the movement of the outer rotor members.

SUMMARY OF THE INVENTION

According to this invention, the heat-absorbing segments which are arcuate and in an annular configuration are restrained and rotation prevented by a steel band or belt extending around the peripheral surfaces of the segments. Axial movement of the band is controlled by extensions of the radially outer edges of the facing members which overlap the edges of the band.

The segmented disc assemblies are also held together by rivets connecting adjoining facing members to the underlying segments at the inner periphery which is configured for engagement by the torque transmitting parts of the brake or clutch. Each of the facing members may overlap two of the heat-absorbing segments and therefore serves as a connecting member between the segments in addition to a friction member for engaging other friction members on other disc assemblies.

The accompanying drawings show one preferred form made in accordance with and embodying this invention and which is representative of how this invention may be practiced.

BRIEF DESCRIPTION OF THE DRAWINGS

In the drawings:

FIG. 1 is a side elevation of a part of an annular disc assembly (shown in solid lines), certain parts being broken away, and illustrated in torque driving engagement with a related part which, in this example, may be a splined torque tube, the sides of which are represented by the chain-dotted lines.

FIG. 2 is a sectional view taken along the planes of lines 2—2 of FIG. 1.

FIG. 3 is a side elevation of one of the facing members showing the inside face which abuts the heat-abosrbing segments.

DETAILED DESCRIPTION

Referring to FIG. 1, an annular segmented friction member or disc assembly 10 is shown which is made up of a series of adjacent heat-absorbing, load-bearing segments 11, each of which has an arcuate sector shape. The adjoining segments 11 have side edges 12 in opposing relationship. Each of the segments 11 has a radially outer edge portion 13 having a curvature with a radius substantially equal to the radius R of the disc assembly 10 as indicated in FIG. 1.

A circumferentially continuous restraining member such as a relatively thin band 14 extends around the disc assembly 10 in engagement with the radially outer edge portion 13 of each of the segments 11. The band 14 may be of steel or some other material having strength in tension and may be butt-welded in a ring having a curvature with the same radius R as the radially outer portion 13 of each of the segments 11. Preferably, the width of the band 14 is the same as the width of the segments 11 so as to cover the outer edge portion 13 of the segment.

Connecting members 15 overlap the outer faces of the segments 11 and may be arcuate, segmented and arranged in a series on one side of the annulus of segments and in another series on the opposite side of the segments. The connecting members 15 may be plates of metal such as steel and have radially outer edges 16 overlapping the edges of the band 14 to prevent axial movement of the band relative to the segments 11.

As shown in FIG. 3, the connecting members 15 have torque buttons 17 which may be fastened as by welding to the inner faces of the connecting members. As shown in FIG. 2, the torque buttons 17 have aligned openings 18 in which serrated pins 19 are secured as by a press-fit to hold the opposing connecting members 15 together and transmit torque from the connecting members to the segments 11.

As shown in FIG. 1, the segments 11 have recesses 20 in the side edges 12 for receiving the torque buttons 17. The segments 11 also have offset corners 24 at the radially inner peripheries providing slots 25 at the inner periphery of the disc assembly 10 for receiving interfitting splines 26 of an associated torque tube or other central member of a brake or clutch which is represented in chain-dotted lines.

The connecting members 15 have radially extending side edges 27 which are in opposing relationship to the side edges of adjacent connecting members. The side edges 27 are circumferentially offset from the side edges 12 of the heat-absorbing segments 11 so that when the connecting members and segments are fastened together, they form a unitary annular structure. At the inner periphery of the connecting members 15, the side edges 27 are offset forming ears 28 which extend circumferentially in overlapping relationship with the ears of adjoining connecting members. The ears 28 have holes 29 in aligned relationship with holes 30 in the segments 11 between the corners 24 at the inner periphery. Fasteners such as rivets 31 extend through the overlapping ears 28 on one side of the segments 11 through the holes 30 in the segments and through the overlapping ears 28 on the other side of the segments and not only retain the segments between the connecting members but also connect the adjoining connecting members and thus form a continuous articulated annular enclosure for the heat-absorbing segments 11.

A friction lining material 35 may be adherred to the connecting members 15 on the outer surface thereof, as shown in FIGS. 1 and 2, and may be of the type described and set forth in U.S. Pat. No. 2,966,737 of R. E. Spokes et al.

In operation, the disc assembly 10 is movable axially along the splines 26 of the torque tube into engagement with adjacent disc assemblies producing a tangential force on the connecting members 15 through the friction lining material 35. This tangential force is transmitted to the segments 11 through the torque buttons 17 and tends to cause the segments to rotate. causing the radially outer edge portions 13 to move radially outward. The band 14 in engagement with the radially outer edge portions 13 restrains this movement resisting the rotation of the segments 11 and preventing radially outward movement of the radially outer edge portions. In this way, the undesirable rotation of the segments 11 is restrained with a construction which does not add substantial weight or require additional space. Also, the construction is of a type making maintenance and assembly convenient and at a minimum cost.

I claim:

1. An annular segmental friction member of a brake or clutch mechanism comprising a plurality of arcuate segments in circumferentially spaced-apart positions, said segments having radially extending faces spaced apart a predetermined width for movement with the friction member toward and away from opposing faces of an associated brake or clutch structure, connecting members between said arcuate segments overlying said radially extending faces on both sides of said segments, torque-transmitting means at radially inner portions of said segments for engagement with a central member of said brake or clutch, a circumferentially continuous restraining member having a width the same as said predetermined width of said segments covering the radially outer edge portions of said segments, said connecting members having radially outer edges overlapping said restraining member on both sides whereby radial movement and rotation of said segments is restrained and axial movement of said restraining member is limited in both axial directions.

2. A friction member according to claim 1 wherein fasteners extend through said connecting members and said segments at said radially inner portions of said segments for connecting said segments.

* * * * *